United States Patent [19]

Jergl et al.

[11] Patent Number: 4,613,550
[45] Date of Patent: Sep. 23, 1986

[54] VENTING SYSTEM FOR ELECTRIC STORAGE BATTERIES

[75] Inventors: Joseph J. Jergl, Minneapolis; William H. Kump, Mendota Heights, both of Minn.

[73] Assignee: GNB Incorporated, Mendota Heights, Minn.

[21] Appl. No.: 770,945

[22] Filed: Aug. 30, 1985

[51] Int. Cl.⁴ .............................................. H01M 2/12
[52] U.S. Cl. ......................................... 429/53; 429/82
[58] Field of Search ..................... 429/82, 53, 87, 88

[56] References Cited

U.S. PATENT DOCUMENTS

| | | | |
|---|---|---|---|
| 3,666,564 | 5/1972 | Corbin et al. | 429/88 |
| 4,371,591 | 2/1983 | Oxenreider et al. | 429/175 X |
| 4,374,187 | 2/1983 | Sano | 429/88 X |
| 4,444,853 | 4/1984 | Halsall et al. | 429/177 X |
| 4,486,516 | 12/1984 | Poe | 429/82 |

Primary Examiner—Charles F. LeFevour
Attorney, Agent, or Firm—Augustus J. Hipp; Keith B. Willhelm

[57] ABSTRACT

A multi-cell, lead-acid electric storage battery of the wet or absorbed electrolyte type is provided. The battery comprises one or more manifolding apertures in one or more partition walls, which apertures are of a size which allows passage of gases and in wet batteries minimizes passage of electrolyte and which define one or more sets of manifolded cells; a single trapping chamber associated with each set of manifolded cells; one or more vent apertures for wet battery applications or a pressure release valve for absorbed electrolyte battery applications is disposed between each set of manifolded cells and its respective trapping chamber, which vent apertures are of a size which allows passage of gases and in wet batteries minimizes passage of electrolyte. Additionally, for wet batteries there is provided one or more drain/vent apertures between each set of manifolded cells and its respective trapping chamber, which drain apertures are of a size which allow drainage of electrolyte from the trapping chamber to the manifolded cells and minimize passage of electrolyte from the cells to the trapping chamber and a single exhaust port associated with each of said trapping chambers, which exhaust ports allow passage of gas from the trapping chambers to the ambient. Also, battery spacers are provided to make the batteries compatible with mounting devices for larger batteries, and/or to make the batteries stackable.

10 Claims, 11 Drawing Figures

VENTING SYSTEM FOR ELECTRIC STORAGE BATTERIES

This invention relates to electric storage batteries and, more specifically, to venting systems for wet, lead-acid electric storage batteries.

BACKGROUND OF THE INVENTION

Typically, wet, lead-acid batteries have a right rectangular shaped container and a cover assembly, both parts usually being made of an injection molded thermoplastic polymer, such as polypropylene. The interior of the container frequently is divided by partition walls into cells, and each cell is substantially isolated. Electrode stacks are disposed within each cell and are electrically connected in series. Each cell is filled with electrolyte to a level at least equal to the top of the electrode stack. When the battery is designed to be maintenance free, however, it is preferable that the electrolyte level significantly exceed the top of the stacks.

Such lead-acid storage batteries generate gases, predominantly hydrogen and oxygen, during charging. The presence of hydrogen and oxygen gas creates an obvious potential for explosion, and therefore, those gases must be vented from within the battery to the ambient. Accordingly, wet lead-acid batteries are equipped with a venting system. The venting system must permit substantially complete evacuation of generated gases and, as a generally recognized standard in the industry, within eight hours.

In wet batteries, particularly in maintenance-free wet batteries, there are large quantities of free electrolyte in the cell. That electrolyte can slosh and splash about the interior of the battery during shipment, installation and use of the battery. Moreover, the battery, usually because the vehicle in which it is mounted is so inclined, may be tilted at severe angles which can encourage electrolyte to pass through the venting system. The venting system, therefore, not only must allow gases to vent. It also must prevent electrolyte from escaping, even when the battery is tilted severely and especially in maintenance-free batteries where replenishment of electrolyte is not contemplated.

The venting system generally is located within and defined by the cover assembly, e.g., a primary and secondary cover or a primary cover and one or more cover pieces. Typically, it comprises an internal drain/vent aperture, a trapping chamber and an external exhaust port. The internal drain/vent aperture, typically a vertically oriented, circular or doughnut shaped hole or slits with horizontal and vertical components, is designed such that electrolyte which has entered the trapping chamber may drain through it back into the cell. It also is designed to allow venting of gases while minimizing the passage of electrolyte from the cell into the trapping chamber. The design of drain/vent apertures is illustrated, e.g., in U.S. Pat. No. 4,486,516 to D. Poe (slit with vertical and horizontal components); U.S. Pat. No. 4,371,591 to T. Oxenreider et al. (vertically oriented, circular shaped hole); U.S. Pat. No. 4,002,495 to D. Hakarine (vertically oriented, circular shaped hole); and U.S. Pat. No. 3,666,564 to R. Corbin et al. (vertically oriented, doughnut shaped hole). Some designs incorporate a vent aperture as well, which is designed to allow venting of gases, especially when the drain/vent aperture may be clogged with electrolyte. Such designs are illustrated, e.g., in Poe '516.

The drain/vent aperture, and if the vent aperture, open into a trapping chamber which permits gases to pass to the exhaust port. The trapping chamber, however, generally by utilizing sloped floors and a variety of baffle arrangements, is designed to allow condensation of electrolyte vapors and to prevent electrolyte which entered the chamber through the drain/vent aperture and/or vent aperture from reaching the external exhaust port. It is constructed such that electrolyte collected in the chamber drains through the drain/vent aperture and back into the cell.

The space between the electrolyte level and the top of the battery cover, however, (in which all or part of the trapping chamber is located) is wasted in the sense that it is in no way utilized for the electrochemical performance of the battery. The external dimensions of automotive batteries are largely dictated by convention, i.e., by vehicle manufacturers. In order to achieve the maximum electrochemical performance within given dimensional constraints, such wasted space must be kept to a minimum.

Recombinant or absorbed electrolyte, as opposed to wet, batteries also generate hydrogen and oxygen during charging. Unlike wet batteries, however, the gases evolved in a recombinant battery are substantially induced to recombine within the battery. Accordingly, recombinant batteries are not equipped with a venting system per se. They instead are equipped with a pressure release system, generally comprising a pressure relief valve, which is in communication with the ambient and prevents excessive pressure from building in the battery interior. Examples of such pressure release systems and valves are disclosed, e.g., in U.S. Pat. No. 4,328,290 to J. Szymborski et al. Although there are obvious benefits in using substantially the same cover assembly to manufacture both wet and recombinant batteries, the venting systems incorporated in cover assemblies for wet batteries typically preclude a facile and reliable conversion to a pressure release system.

The venting system, therefore, must be designed to completely and efficiently vent gases and minimize electrolyte escape, even when the battery is tilted at severe angles. It also should be designed so that the wasted space in the battery is minimized. Preferably, its design should be simple and permit easy construction, assembly, and, if desired, conversion of the cover assembly for use in recombinant batteries as well. Unfortunately, conventional designs have not succeeded in achieving all of those objectives simultaneously.

Essentially, there are two types of battery venting system designs commonly in use. They are described as either vertical-type or horizontal-type depending on the orientation of the trapping chamber used. Discrete vent plugs found on many batteries exemplify vertical-type venting systems. The plugs typically include a deep, cylindrical chamber which fits tightly into the filler well of the battery cells. Separation of the electrolyte from the gas occurs primarily by gravity as the gases rise vertically through the cylindrical chamber and the heavier electrolyte falls to the chamber floor. The floor of the chamber slopes toward a central drain/vent aperture through which the gases can pass upwardly and the electrolyte can drain back into the cell. The top of the chamber has an exhaust port for discharging the gases to the atmosphere. The chamber also may contain a variety of internal baffles to aid in preventing electrolyte from reaching the exhaust port. Examples of vertical venting systems are illustrated, e.g., in Hakarine '495. Vertical-type vent systems generally can be effective in venting gases and preventing electrolyte from escaping, but in doing so, may tend to occupy large amounts of wasted space. Additionally, conversion of the typical, vertical-type cover assembly for use in a recombinant battery at the very least would require equipping the assembly with six pressure release valves, an obvious and undesirable expense.

Horizontal-type vent systems, on the other hand, typically include an elongated trapping chamber extending horizontally across at least part of the top of each battery cell. The drain/vent aperture usually is located laterally remote from the exhaust port. Electrolyte entering the chamber must traverse the length of the chamber, and typically a variety of baffles as well, in order to reach the exhaust port, and the floors of the chamber are sloped to encourage return drainage of the electrolyte into the cell. The drain/vent aperture, however, usually is located elevationally much closer to the exhaust port then in vertical vent systems. Horizontal type venting systems are illustrated, e.g., in Poe '516; U.S. Pat. No. 4,444,853 to V. Halsall et al.; Oxenreider '591; and Corbin '564. The chamber height, i.e., the distance between the drain/vent aperture and the exhaust port being reduced, generally there is less wasted space in horizontal type venting systems.

The typical automotive battery, however, comprises six cells, and horizontal venting systems for those batteries necessarily are quite complex. Although it is common to manifold the trapping chambers, i.e., to allow mixing of gases between a plurality of trapping chambers, and thereby utilize fewer exhaust ports, each cell still must be provided with its own drain/vent aperture and trapping chamber. Manifolded trapping chambers and the general complexity of horizontal venting systems are illustrated, e.g., in Poe '516, Halsall '853, Oxenreider '591, and Corbin '564. Thus, horizontal venting systems remain complex, and due to the necessary complexity of the pieces from which they are assembled, difficult to mold and assemble.

The general complexity of most horizontal venting systems and the large amounts of horizontal space which they tend to occupy also creates problems if other features are needed in the battery. For example, it is difficult, impractical, or impossible to accommodate dual terminals, i.e., both side and top terminals, or a recessed, slidable handle in cover assemblies comprising many conventional horizontal venting systems.

Additionally, most horizontal venting systems do not permit the cover assembly to be converted easily for use in recombinant batteries. Typically the conversion is not feasible due to the complexity of the venting system design and, even if not otherwise foreclosed, would require six pressure release valves.

Many horizontal venting systems also do not efficiently vent gases, a major cause of which is pockets defined in the elaborate contours of the cover assembly undersurface. Hydrogen tends to rise. Although Brownian motion may prevent large quantities of hydrogen from being trapped therein, such pockets do tend to impede the flow of gases to the drain/vent aperture and/or vent aperture and thus to the ambient.

Some horizontal-type vent systems utilize a so called "raised" design, in which the exhaust ports and part or all of the trapping chambers are situated above the cover surface. Raised, horizontal venting systems are illustrated, e.g., in Poe '516. The effective chamber height in such designs generally is reduced (by locating the exhaust port above the cover surface), and therefore, raised vents often further reduce the amount of wasted space. Raising the venting system, however, does nothing to reduce the wasted space between the drain/vent aperture and the electrolyte level. Primarily because of the orientation and shape of their drain/vent apertures, horizontal venting systems, including raised vent systems, still must be mounted at a substantial distance above the electrolyte, and even then, many designs tend to leak electrolyte when tilted.

Although raised horizontal vents may be preferred for reducing in part the amount of wasted space, unlike flat top designs, they tend to constrain the degree of standardization which the battery can achieve. That raised top batteries interfere with standardization, i.e., the attempt to make a single battery design compatible with the requirements imposed by as many automobile designs as possible, can be understood by considering, inter alia, the various devices which are used to mount the battery in the vehicle. Examples of such include molded heat shields and horizontally overlaid bars, plates, and L shaped restraints. It is well known, however, that the surface geometry of raised vent systems can interfere with mounting devices and make a battery suitable for one type of vehicle unsuitable for another.

Furthermore, even with flat top designs, standardization is made more difficult because many conventional mounting devices cannot be adjusted to accommodate the variation in external dimensions among batteries. The external dimensions of batteries, as noted above, are dictated by vehicle manufacturers. The more common variations involve battery height, there being a high profile (approximately 8") and a low profile (approximately 7¼"), and battery width, there being a narrow (approximately 6½"), a standard width (approximately 7"), and a wide (approximately 7¼"). In an effort to achieve greater standardization, manufactures have provided smaller batteries with height and/or width spacers to make them compatible with mounting devices designed for larger batteries, e.g., to adapt a low profile battery to high profile battery mounting devices or a standard width battery to wide battery mounting devices. Such spacers generally have been H shaped and aligned longitudinally across the horizontal center line of the cover, but have proven unsatisfactory for adapting the batteries to a sufficiently large number of conventional mounting devices. For example, they do not successfully adapt a low profile battery to a non-vertically adjustable, high profile battery mounting device which comprises molded heat shields. Examples of H shaped, top spacers for modifying battery height or width have been commercialized by GNB Incorporated, Mendota Heights, MN 55118.

Finally, whereas flat top designs are desirable in that they allow greater standardization, they typically preclude stacking of top terminal batteries, i.e., batteries having terminals on the top surface of their cover assembly. Stacking is desired not only for convenience in handling, but also because it allows retailers to build displays. Some top terminal batteries, however, are stackable. Stackable designs typically raise portions of the cover assembly to the level of the top terminals, which as noted above, can interfere with efforts to standardize the battery for the wide variety of conventional mounting devices, or removably connect the terminals to the battery, which can compromise the conductivity and durability of the terminals. Moreover, neither design allows for sufficient stability in large stacks of batteries. Stackable designs are illustrated, e.g., in U.S. Pat. No. 4,448,863 to C. Terrell (removably connected terminals); U.S. Pat. No. 4,424,264 to M. McGuire et al. (raised cover assembly portions); and U.S. Pat. No. 3,871,924 to D. DeMattie et al. (raised cover assembly portions).

In summary, while horizontal venting systems present an improvement over vertical vent systems, they remain complex in design, difficult to make and assemble, and yet do not always provide for complete evacuation of gases or prevent electrolyte from escaping, especially when the battery is tilted. Moreover, their design often interferes or precludes incorporating dual terminals and/or recessed, slidable handles and is not modified easily or economically for use in recombinant batteries. Conventional horizontal venting systems also must be situated so that their drain/vent aperture is located a significant distance above the electrolyte level and, therefore, contribute to wasted space in the battery, even in a raised design. In raised designs, however, the venting system interferes with attempts to standardize the battery. Finally, although more susceptible to standardization than raised designs, flat top batteries, even with known spacers, fail to achieve a satisfactory degree of standardization and/or are not stackable.

An object of this invention, therefore, is to provide a horizontal venting system which performs efficiently yet which is simple in design, construction, and assembly.

A further object of this invention is to provide a horizontal venting system which can be mounted closer to the electrolyte level and thereby reduce the amount of wasted space in the battery.

Another object of this invention is to provide a horizontal venting system which permits substantially all generated gases to vent to the atmosphere within eight hours.

A further object of this invention is to provide a horizontal venting system which prevents electrolyte escape even when the battery is tilted at severe angles.

Another object of this invention is to provide a horizontal venting system such that the cover assembly in which it is defined can accommodate easily dual terminals and/or recessed slidable handles.

A further object of this invention is to provide a horizontal venting system for a wet battery which can be modified readily and economically such that the cover assembly in which it is defined can be used in recombinant batteries.

Yet another object of this invention is to provide a low profile, flat top battery, especially one having top terminals, with a spacer such that the battery is compatible with high profile battery mounting devices and is stackable.

Another object of this invention is to provide a narrow or standard width battery with a spacer such that the battery is compatible with mounting devices designed for wider batteries.

Other objects of the present invention will become apparent from the following description.

SUMMARY OF THE INVENTION

The present invention provides for a wet, multi-cell, lead-acid electric storage battery comprising a container, a cover assembly, one or more partition walls dividing the space within the container and cover assembly into two or more cells, and a horizontal vent system, which vent system comprises:

(a) one or more manifolding apertures in one or more of the partition walls, which apertures are of a size which allows passage of gases and minimizes passage of electrolyte and which define one or more sets of manifolded cells;

(b) a single trapping chamber associated with each set of manifolded cells;

(c) one or more vent apertures between each set of manifolded cells and its respective trapping chamber, which vent apertures are of a size which allows passage of gases and minimizes passage of electrolyte;

(d) one or more drain/vent apertures between each set of manifolded cells and its respective trapping chamber, which drain apertures are of a size which allows drainage of electrolyte from the trapping chamber to the manifolded cells and minimizes passage of electrolyte from the cells to the trapping chamber; and (e) a single exhaust port associated with each of the trapping chambers, which exhaust ports allow passage of gas from the trapping chambers to the ambient.

The present invention also provides for a wet, multi-cell, lead-acid electric storage battery wherein the vent and drain/vent apertures of the venting system are horizontally oriented, circular shaped holes and wherein the manifolding apertures and the vent apertures are located near the plane generally contiguous to the undersurface of the cover assembly, which undersurface substantially defines only negative contours, i.e., it does not define any pockets which may impede the flow of gases to the vent apertures. It further provides for a wet, multi-cell, lead-acid electric storage battery wherein the drain/vent and vent apertures are located in the vicinity of the longitudinal center plane of the battery and wherein the battery also comprises dual terminals and/or a recessed, slidable handle.

It will be appreciated that by manifolding the cells, a reduced number of trapping chambers is possible, and the design, molding, and assembly of the vent system is simplified thereby. It also can be appreciated that by orienting the drain/vent and vent apertures horizontally, electrolyte is less likely to pass through those apertures into the trapping chamber, and accordingly the drain/vent apertures can be situated much closer to the electrolyte level. It will be appreciated further that by locating the manifolding apertures and the vent apertures near the plane generally contiguous to the undersurface of the cover assembly and by assuring that the undersurface defines only negative contours, gas flow is not impeded in the battery interior. It also will be appreciated that by locating the drain/vent and vent apertures in the vicinity of the longitudinal center plane of the battery, electrolyte is less likely to escape when the battery is tilted. Finally, it will be appreciated that by manifolding the cells and providing a single trapping chamber for each set of manifolded cells, less space in the cover assembly is devoted to the venting system and more space is available to accommodate dual terminals and recessed, slidable handles.

The present invention also provides for a recombinant, multi-cell, lead-acid electric storage battery comprising a container, a cover assembly, one or more partition walls dividing the space within the container and cover assembly into two or more cells, and a pressure release system, which pressure release system comprises:

(a) one or more manifolding apertures in one or more of the partition walls, which apertures are of a size which allows passage of gases and minimizes passage of electrolyte and which define one or more sets of manifolded cells;

(b) a single trapping chamber associated with each set of manifolded cells;

(c) a pressure release valve between each set of manifolded cells and its respective trapping chamber; and (d) a single exhaust port associated with each of the trapping chambers, which exhaust ports allow passage of gas from the trapping chambers to the ambient.

It will be appreciated that by manifolding the cells and by providing a single trapping chamber for each set of manifolded cells the horizontal venting system for a wet battery may be readily converted to a pressure release system and the cover assembly used in a recombinant battery. The modification can be accomplished easily by eliminating the drain/vent and vent apertures and by mounting a pressure release valve through the trapping chambers.

The present invention further provides for an electric storage battery comprising a spacer and means for removably attaching said spacer to the bottom of said battery, wherein the spacer has external dimensions such that when attached to said battery the combined value of at least one dimension of said spacer and battery is generally equivalent to that dimension in a larger battery. More particularly, it provides for a flat-top, low profile, lead-acid electric storage battery with a removably attachable height spacer whereby the battery is compatible with both low and high profile battery mounting devices. In other aspects, the present invention provides for a height spacer which allows stacking of the batteries as well. The present invention also provides for narrow and standard width, lead-acid electric storage batteries with removably attachable width spacers whereby said batteries are compatible with mounting devices for wider batteries.

While this invention will be disclosed and discussed primarily in terms of specific embodiments thereof, it is not intended to be limited thereto. Other modifications and embodiments will be apparent to the worker in the art.

DETAILED DESCRIPTION OF THE INVENTION

Figure 1:
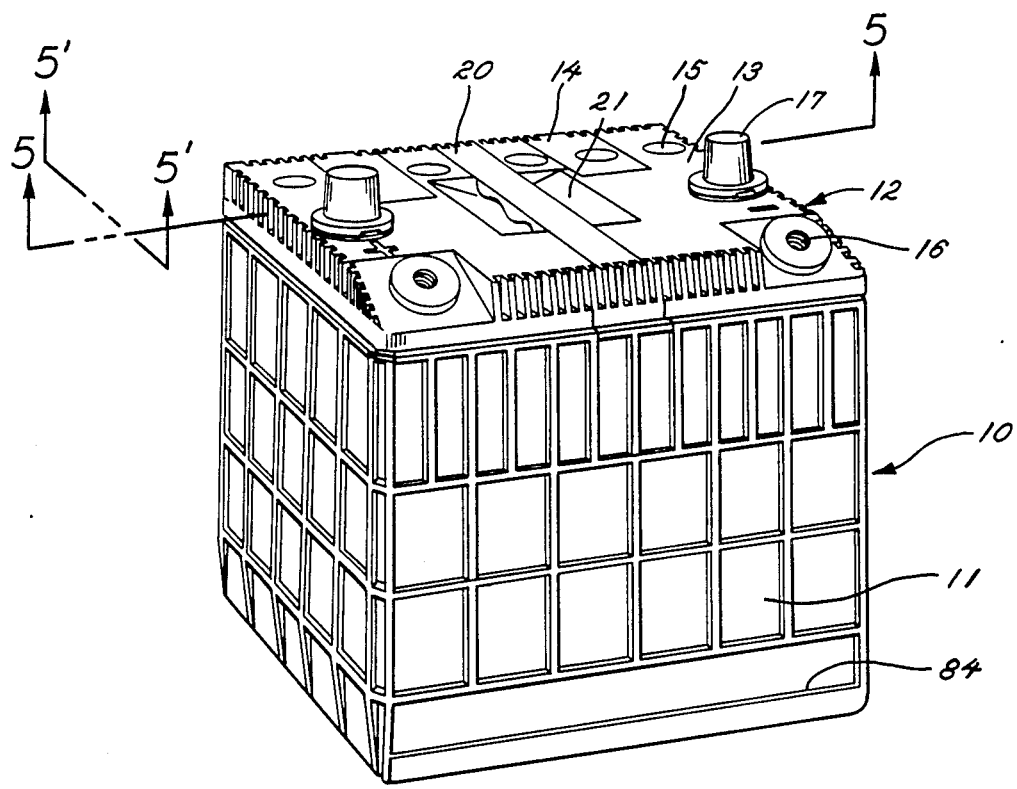
FIG. 1 is a perspective view of a preferred embodiment of the battery of the subject invention.
Figure 2:
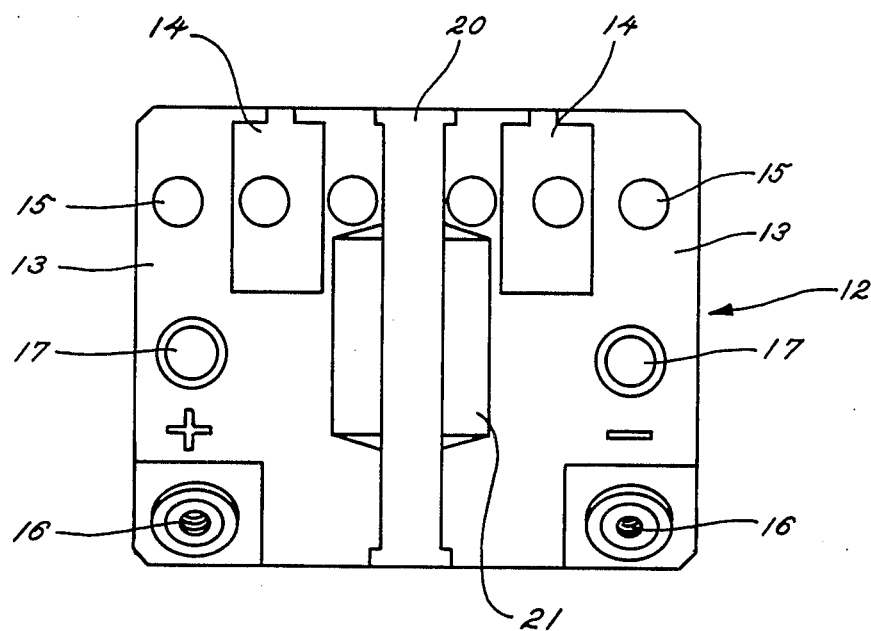
FIG. 2 is a top plan view of the battery 10 shown in FIG. 1 showing in particular, the component pieces of the cover assembly 12.
Figure 3:
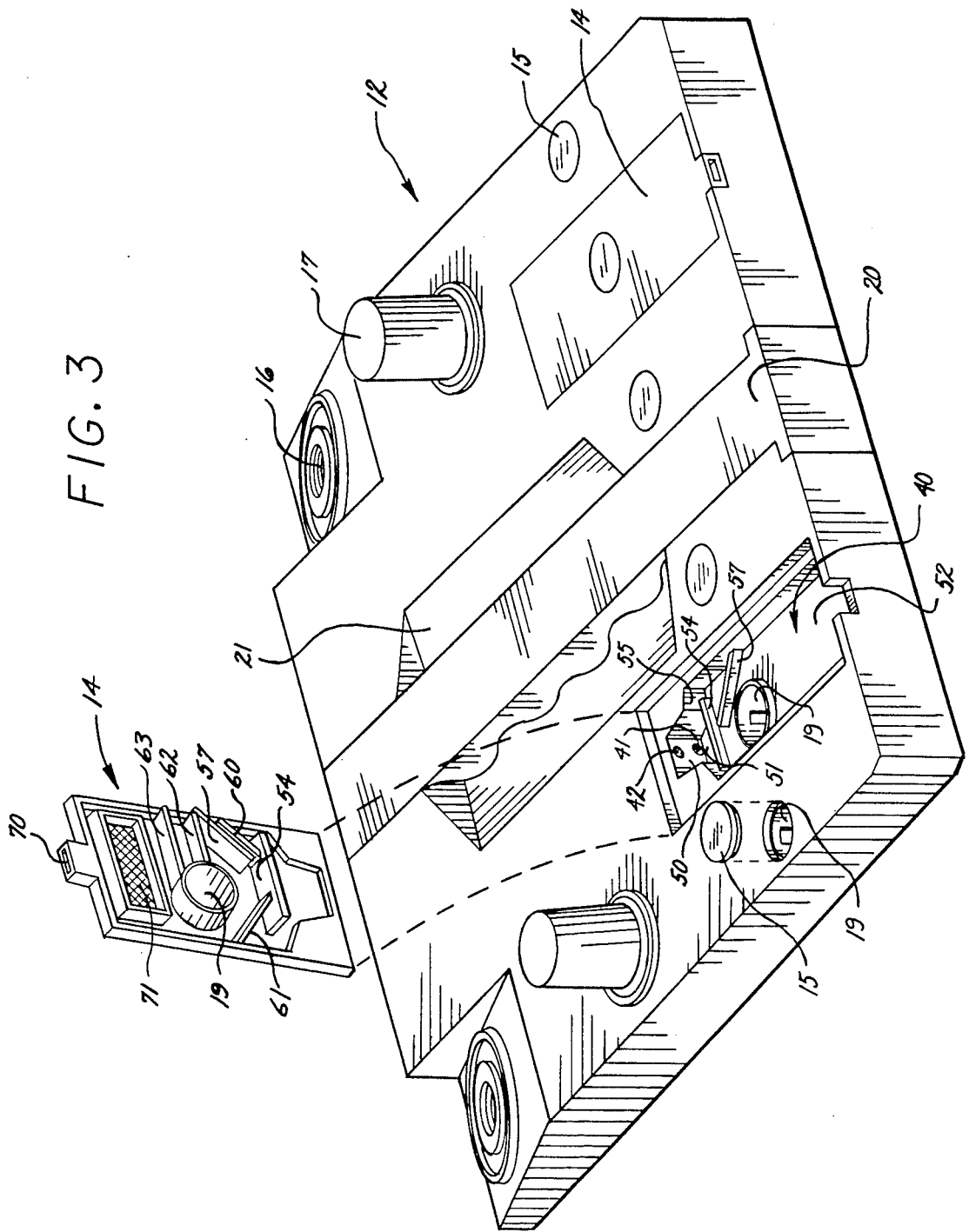
FIG. 3 is an exploded perspective view of the battery cover assembly 12 showing details of the venting system.

FIGS. 1-6 illustrate a preferred embodiment of the storage battery of the subject invention. The battery 10 is constructed of a generally right rectangular shaped container 11 to which is sealed a cover assembly 12. The cover assembly comprises a primary cover 13, a pair of cover pieces 14, and fill caps 15. Mounted in and extending through the cover assembly 12 are a pair of side terminals 16 and a pair of top terminals 17. The battery 10 is provided with a recessed, slidable handle which can be constructed according to a variety of known designs, but herein preferably is constructed as disclosed in U.S. Pat. Appl. Ser. No. 770,944, of W. Kump et al., filed herewith on Aug. 30, 1985 and entitled Battery Carrying Handle, the disclosure of which is incorporated in its entirety by this reference thereto. The interior of the battery is divided into cells 30, which cells 30 are defined in part by partition walls [not shown] depending from the battery container 11 and abutting partition walls 31 depending from the primary cover 13.

The container 11, the various parts of the cover assembly 13, and the handle 20 may be formed from a variety of conventional materials by a variety of conventional techniques. For example, they may be formed of a thermoplastic polymer, such as polyethylene, polypropylene, and their co-polymers, by injection molding techniques. Likewise, any of several known techniques may be used to seal the parts, e.g., heat sealing with or without adhesives, adhesives alone, or solvents.

In accordance with the subject invention, excepting the center partition wall 31c, located in outer partition walls 31a, 31b, 31d, and 31e, are manifolding apertures 32 for manifolding the gases in cells 30a, 30b, and 30c, and 30d, 30e, and 30f. Each set of manifolding apertures 32 has a combined cross-section such that gases are readily exchanged between the cells, but the cross-sections of each manifolding aperture 32 is such that the surface tension of the electrolyte does not allow it to pass normally. Accordingly, the gases are manifolded, and any significant exchange of electrolyte between the cells is foreclosed.

With sulfuric acid based electrolytes, it has been determined that sets of five, circular shaped manifolding apertures 32 having diameters of approximately 0.065" provide excellent results, but of course, those values are exemplary only and may vary, primarily according to the properties of the electrolyte. When, as noted below in greater detail, the apertures 32 are located near the under surface of the primary cover 13, no significant accumulation or depletion of electrolyte in any cell 30 has been experienced even after extended periods of charging and vibration well above the levels expected during normal service.

Other arrangements and configurations of manifolding apertures within the scope of this invention, however, are possible, e.g., slits or ovals wherein the cross-section along at least one (preferably, the horizontal) axis is such that the surface tension of the electrolyte does not allow it to pass readily through the aperture. It is only necessary that the manifolding apertures 32 allow exchange of gases between the manifolded cells while preventing any significant transfer of electrolyte. Such manifolding apertures 32 permit, in accordance with an important feature of the subject invention, the use of a single trapping chamber 40 per set of manifolded cells 30, and therefore, much simpler design, construction, and assembly of the venting system.

Figure 4:
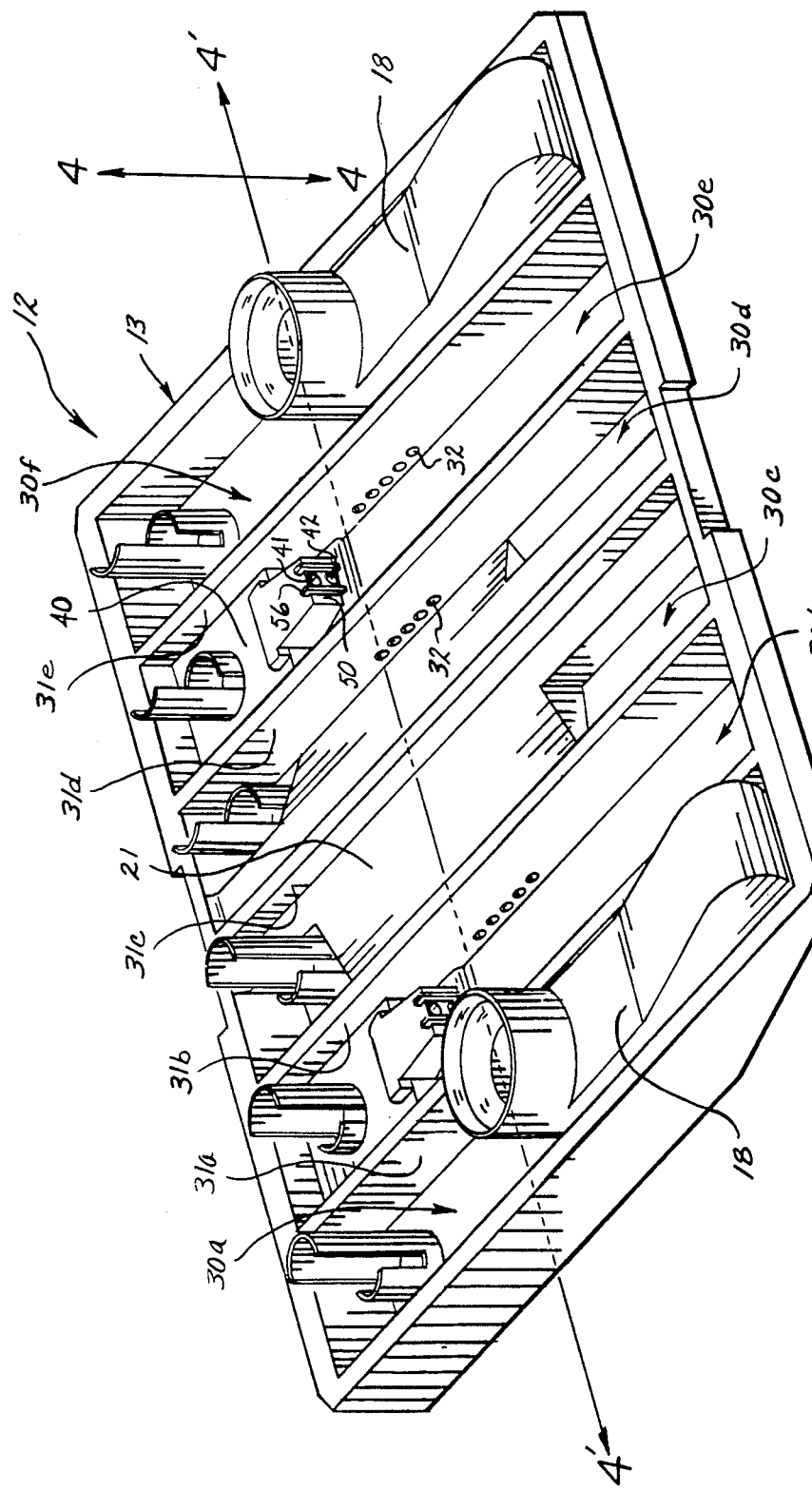
FIG. 4 is a perspective view of the undersurface of the primary cover 12 showing details of the venting system.
Figure 5:
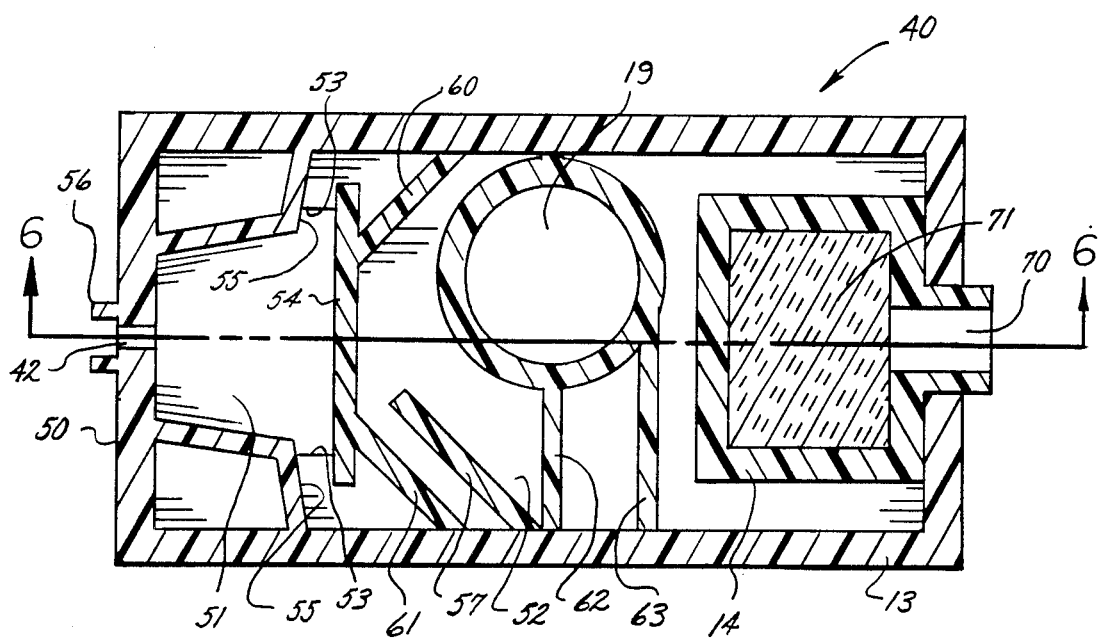
FIG. 5 is a cross-sectional view taken generally along the plane defined by lines 5—5 and 5'—5' shown in FIG. 1, which cross-sectional view shows certain details of the trapping chamber 40.
Figure 6:
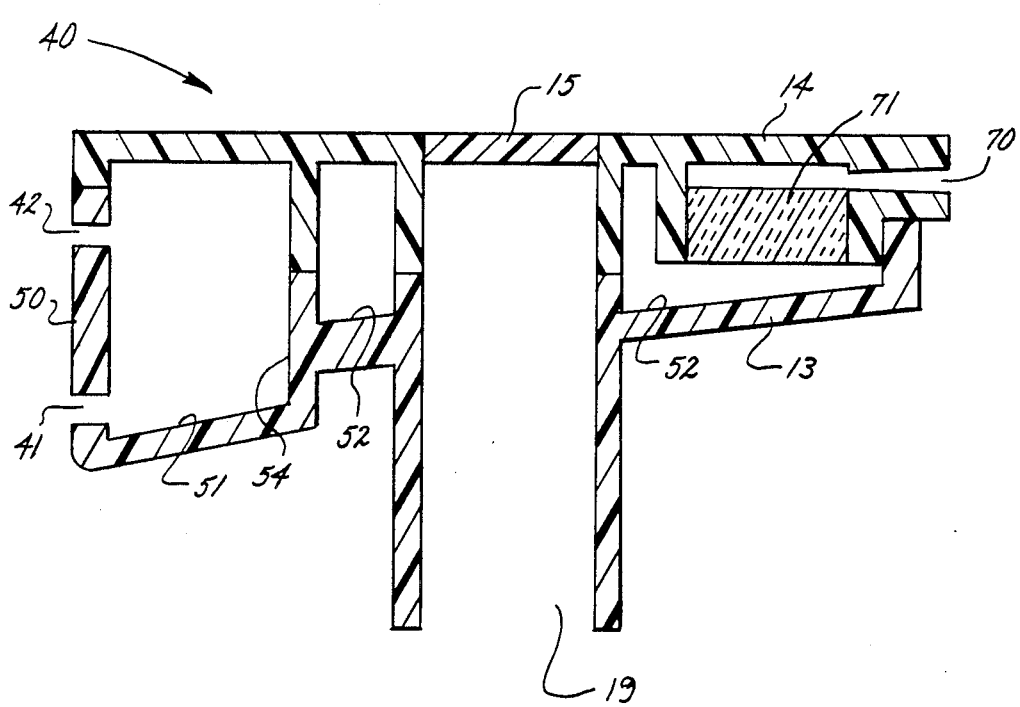
FIG. 6 is a cross-sectional view of a slice taken generally along line 6—6 of FIG. 5 and shows certain details of the trapping chamber 40.

It should be noted that in accordance with another feature of the subject invention and as best shown in FIG. 4, the manifolding apertures 32 are situated very near the plane generally contiguous with the generally flat undersurface of the primary cover 13. While the undersurface is generally flat, it does have projections protruding downward therefrom, namely the partition walls 31, the trapping chamber 40, and portions 18 wherein the terminals 16 and 17 are mounted. It also may have (not shown) ribs extending between the portions 18 and adjoining partition walls 31 and guides along the bottom edges of the primary cover 13 and partition walls 31 to aid, respectively, in shaping the cover assembly 12 and in seating it to the container 11 during automated assembly and heat sealing. Nevertheless, the undersurface substantially defines only negative contours, i.e., the undersurface, as opposed to positive and negative contours, does not define any pockets of significant size which may impede the flow of gases to the vent aperture 42. Accordingly, gases are allowed to vent substantially completely to the ambient within eighth hours.

As provided by this invention, the trapping chamber 40 comprises a drain/vent aperture 41 and a vent aperture 42, which in accordance with this preferred embodiment, are oriented horizontally in a vertical wall 50 of the trapping chamber 40. The vent aperture 42 is located near the plane generally contiguous to the undersurface of the primary cover 13. It is generally circular shaped and has a diameter such that given the surface tension of the electrolyte, electrolyte ordinarily will not pass through it. As its name implies, the vent aperture 42 is designed primarily to allow gas to vent from the manifolded cells 30 to the trapping chamber 40.

The drain/vent aperture 41 is located near the lower floor 51 of the trapping chamber 40, and is sized such that electrolyte collected within the trapping chamber 40 may drain through it. The size of the drain/vent aperture 41 should not be any larger than needed to allow passage of electrolyte. As noted in greater detail below, by providing vertical ridges 56 adjacent the drain/vent aperture 41 to draw electrolyte from the trapping chamber 40 through the drain/vent aperture 41, the size of the drain/vent aperture 41 may be such that without the ridges the electrolyte normally not flow through the drain/vent aperture 41. Although its primary function is to allow drainage of electrolyte from the trapping chamber 40 to the manifolded cells 30, the drain/vent aperture 41 also functions to vent gas from the manifolded cells 30 to the trapping chamber 40.

It has been determined that a single, circular shaped, drain/vent aperture 41 and vent aperture 42 per trapping chamber, which apertures 41 and 42 have diameters, respectively, of approximately 0.090" and 0.065", provides excellent results. As generally noted above in reference to the manifolding apertures 32, those values are exemplary and may vary within the scope of the invention so long as they perform their stated functions. Additional drain/vent and vent apertures may be utilized in each trapping chamber, of course, but especially when additional drain/vent apertures are provided or the total cross section of the apertures is increased, there may be a greater likelihood of electrolyte entering the trapping chamber and accordingly, the trapping chamber must be situated somewhat more distant from the electrolyte level to compensate. Moreover, a single drain/vent aperture may be used in each trapping chamber instead of a drain/vent and vent aperture. In that case, the single aperture preferably would be key-hole shaped. The circular shaped portion of the aperture would be located near the lower floor of the trapping chamber and perform primarily a draining function and the slit portion of the aperture would have a width such that the surface tension of the electrolyte normally prevents the electrolyte from passing through it, have a height extending near the undersurface of the primary cover, and would perform primarily a venting function. Additionally, the drain/vent and vent apertures may have other shapes, e.g., as noted above in reference to the manifolding apertures 32, the vent aperture may be shaped as a slit or oval.

While the size and shape of the vent aperture 42 and the drain/vent aperture 41 are important and are reflected in preferred embodiments of the invention, their substantially horizontal orientation is another preferred feature of the subject invention. Horizontal orientation also significantly lessens the tendency for electrolyte to pass through the apertures 41 and 42 into the trapping chamber as compared to vertically oriented apertures of the same shape and cross-section. With the horizontally oriented drain/vent aperture 41 and vent aperture 42, therefore, it is possible to move the drain/vent aperture 41 closer to the electrolyte level while achieving the same performance, in terms of restricting electrolyte escape, as achieved by vertically oriented drain/vent apertures located higher above the electrolyte surface.

Moreover, as best shown in FIG. 4 and in accordance with a preferred feature of this invention, the drain/vent apertures 41 and vent apertures 42 are situated near the longitudinal center plane of the battery 10, defined by lines 4—4 and 4'—4' of FIG. 4. By doing so, electrolyte is less likely to pass through the drain/vent apertures 41 and vent apertures 42 when the battery is tilted at severe angles. Obviously, locating those apertures near one extreme side would be more effective when the battery is tilted toward the other side. Nevertheless, the battery is equally likely to be tilted toward either side, and when that scenario is reversed and the battery is tilted toward the side near which the apertures are located, even at relatively modest angles, electrolyte can flow easily into the trapping chamber. It is preferable, therefore, that the drain/vent apertures 41 and vent apertures 42 be located, as shown in FIG. 4, near the longitudinal center plane of the battery.

In accordance with a primary feature of the subject invention, a single trapping chamber 40 is associated, respectively, with each set of manifolded cells 30a, 30b, and 30c and 30d, 30e, and 30f. As noted above, the use of a single trapping chamber 40 for a set of manifolded cells 30 is possible because of the manifolding apertures 32 and contributes to a simpler design which is more easily molded and assembled. The single trapping chamber 40 per set of manifolded cells 30 also frees up space in the cover assembly for mounting both side terminals 16 and top terminals 17 and for receiving the recessed, slidable handle 20. The mounting of the terminals 16 and 17 is disclosed in further detail in U.S. Pat. Appl. Ser. No. 770,946 of W. Kump et al., filed herewith on Aug. 30, 1985 and entitled Battery Comprising Dual Terminal Bushing, the disclosure of which is incorporated in its entirety by this reference thereto, as is the construction of the handle 20 and recess 21 in the above referenced application entitled Battery Carrying Handle. Other terminal and handle designs may be utilized, but it can be appreciated readily from viewing FIG. 4, that providing a trapping chamber for each battery cell can interfere with or preclude the inclusion of those and many conventional designs for terminals and handles. Moreover, it also can be appreciated that other manifolding arrangements are possible within the scope of this invention, but that the arrangement comprising two sets of three manifolded cells 30 is preferred because it not only balances the need to simplify the design of the venting system with the need to efficiently vent gases, but it frees up enough horizontal space in the cover assembly 12 for mounting the terminals 16 and 17 and the handle 20.

Each trapping chamber 40 is defined in part by an upper floor 52 which generally slopes down to a lower floor 51 which in turn slopes generally down to the drain/vent aperture 41. The upper floor 52 and the lower floor 51 are separated by risers 53 and wall 54. Wall 54 is separated from walls 55 at a distance such that drainage from the upper floor 52 over the risers 53 to the lower floor 51 is aided by capillary action. Similarly, vertical ridges 56 are disposed adjacent the drain/vent aperture 41 and near the vent aperture 42 and extend into the interior of cells 30b or 30e, as the case may be, so that return drainage of electrolyte from those apertures 41 and 42 is aided by capillary action. Extending down from the under surface of cover piece 14 and up from the upper floor 52 is a baffle 57, which cooperates with wall 54 and the walls of fill hole 19 to define a tortuous path by which electrolyte must follow to reach the exhaust port 70. Additionally, a series of hanging baffles 60, 61, 62, and 63 extend down from the under surface of cover piece 14 to a level above the upper floor 52, and serve to pop any bubbles which may form in the electrolyte as it passes through apertures 41 and 42. Mounted on the under surface of cover piece 14 and covering the exhaust port 70 is a flame arrestor 71 of conventional composition, e.g., microporous polypropylene. Other configurations of floors, walls, baffles, and hanging baffles, however, may be used in the subject invention so long as the trapping chamber serves its intended purpose of collecting and refluxing electrolyte which enters the chamber.

Figure 7:
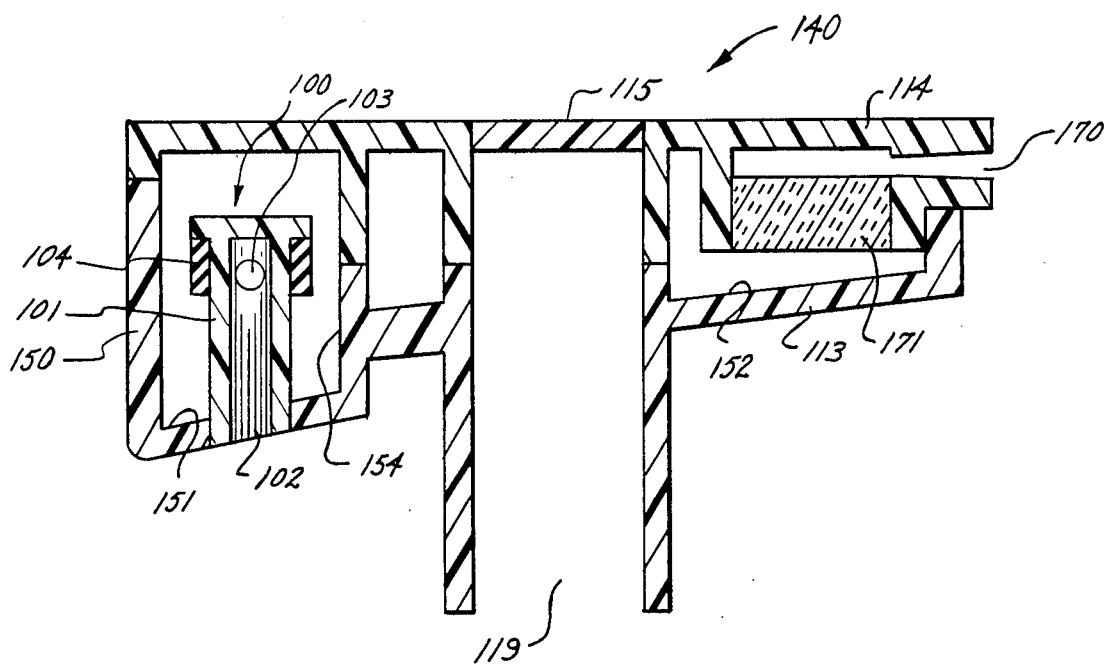
FIG. 7 is a view analogous to that of FIG. 6 except that in FIG. 7 the trapping chamber 140 is modified, inter alia, by inclusion of a pressure release valve 100 such that it comprises part of a pressure release system for a recombinant battery.
Figure 8:
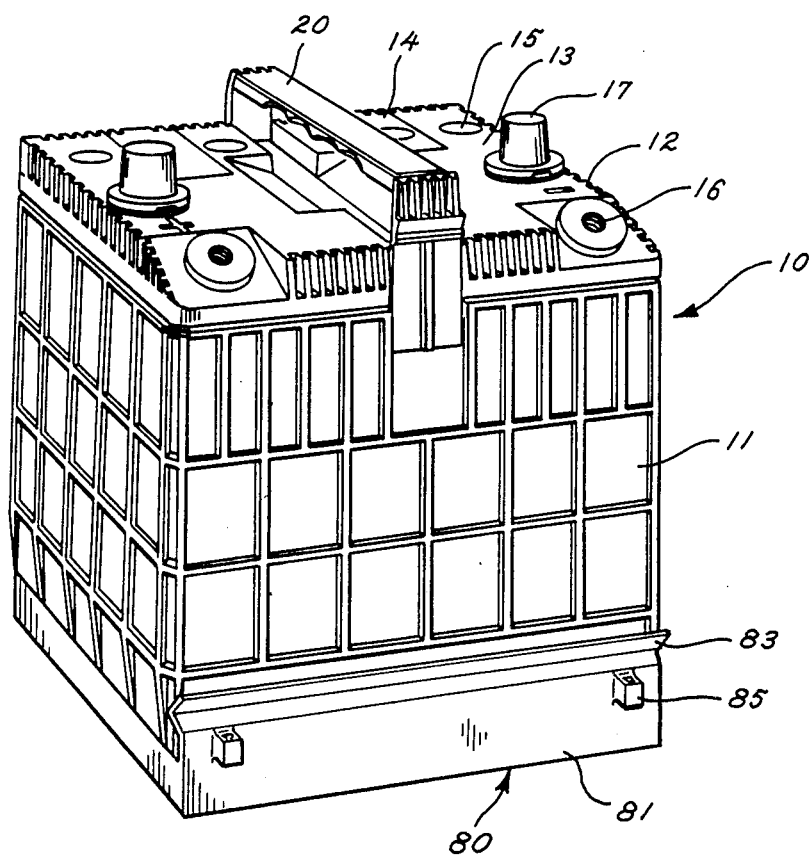
FIG. 8 is a perspective view of the battery 10 shown in FIG. 1 with a preferred embodiment of a removably attachable, height spacer 80 of the subject invention.
Figure 9:
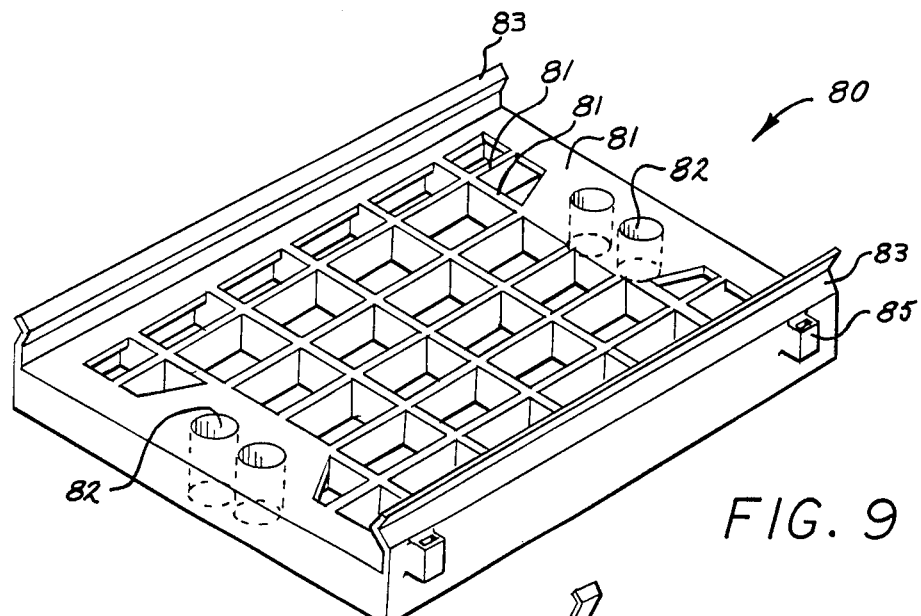
FIG. 9 is a perspective view of the height spacer 80 shown in FIG. 8 showing details of its construction.

In accordance with a preferred feature of this subject invention, the venting system herein described for use in wet batteries may be converted easily and economically to a pressure release system and substantially the same cover assembly used in a recombinant battery. As best shown by comparing FIGS. 6 and 7, the conversion may be accomplished by eliminating the drain/vent apertures 41 and the vent apertures 42 and by providing a pressure release valve 100 through the lower floor 151 of each trapping chamber 140. Neither the trapping chambers 140 or a cover assembly in which they are comprised need be modified in any other detail from the venting system and cover assembly 12 shown and described above in reference to FIGS. 1-6. It will be appreciated, however, that certain preferred limitations of the venting system, such as the size of the manifolding apertures 32, are not as critical once the cover assembly 12 is modified for use in a recombinant battery simply because there is substantially no free electrolyte in the cells.

The pressure release valve 100 comprises a capped, generally cylindrical tube 101 in communication with the battery interior through an opening 102 in the lower floor 151 of the trapping chamber 140. The tube 151, according to the pressure in the battery interior, is in communication with the trapping chamber 140 via a hole 103, which hole 103 normally is covered by an elastic band 104 encircling the tube 101. The elastic properties of the band 104 are such that at predetermined pressures the band 104 is forced away from the hole 103 and gases are allowed to vent from the battery interior to the trapping chamber 140. The design of the pressure release valve 100 is conventional, as disclosed, e.g., in Szymborski '290 but other known designs may be utilized as well. As stated above, subject to certain constraints, the exact configuration of the trapping chamber 40 is subject to variation. When the option of converting the venting system to a pressure release system is desired, however, the configuration of the trapping chamber 40 should provide space, preferably in its lower regions, for mounting a pressure release valve.

In accordance with preferred embodiments of the subject invention and as shown in FIGS. 8–11, the battery 10 is provided with height and width spacers 80, 280, 380. In these preferred embodiments, the battery 10 is a low profile, standard with, flat top battery, i.e., it has a height, measuring from the top surface of the primary cover 13, of about 7¼" and a width of about 7 inches. The spacers 80, 280, 380, like the battery container 11 and cover assembly 12, may be made of a variety of materials, preferably an injection molded thermoplastic polymer, such as polypropylene.

Accordingly, the body of the height spacer 80 has a height of about ¾", whereby the combined height of the height spacer 80 and battery 10 is approximately 8", i.e., that of a high-profile battery. Its horizontal dimensions, i.e., its length and width are substantially equivalent to those of the battery 10. The height spacer 80 is removably attached to the bottom of battery 10, and therefore, the low profile battery 10 may be readily mounted in either low profile or high profile battery mounting devices, whether or not those mounting devices are vertically adjustable, simply by removing or attaching the height spacer 80.

The body of the spacer 80 is substantially hollow, it being defined generally by two perpendicularly intersecting sets of parallel, beam-like members 81 which generally define a checkerboard-type pattern. The exact configuration, however, is not critical in that regard, however, in that any design which is substantially hollow but which is rigid enough to support the weight of the battery 10 may be used and still achieve the cost benefits derived from using less plastic in constructing the height spacer 80.

In accordance with a preferred feature of the subject invention, a plurality of holes 82 are defined in the height spacer 80 to not only accommodate the top terminals of a similarly designed battery (not shown), and thereby to permit stacking of the two, but to do so when the batteries are stacked facing in the same or opposite directions. The exact location and configuration of these holes 82, of course, will be dictated by the size, shape, and arrangement of the top terminals 17. It also can be appreciated that the height spacer holes 82 and the top terminals 17 of adjacently stacked batteries cooperate to restrict the lateral movement of the stacked batteries relative to each other and, thereby, permit the stacking of more batteries with greater stability.

Preferred means for removably attaching the spacer 80 to the battery 10 comprise hook members 83. The hook members 83 are adapted to be bent back for hooking and unhooking the members 83 over ridges 84 (shown in FIG. 1) extending from opposing sides of the battery container 11. Slots 85 are mounted on hook members 83 such that detachment of the height spacer 80 is facilitated by inserting and levering a screwdriver therein.

Figure 10:
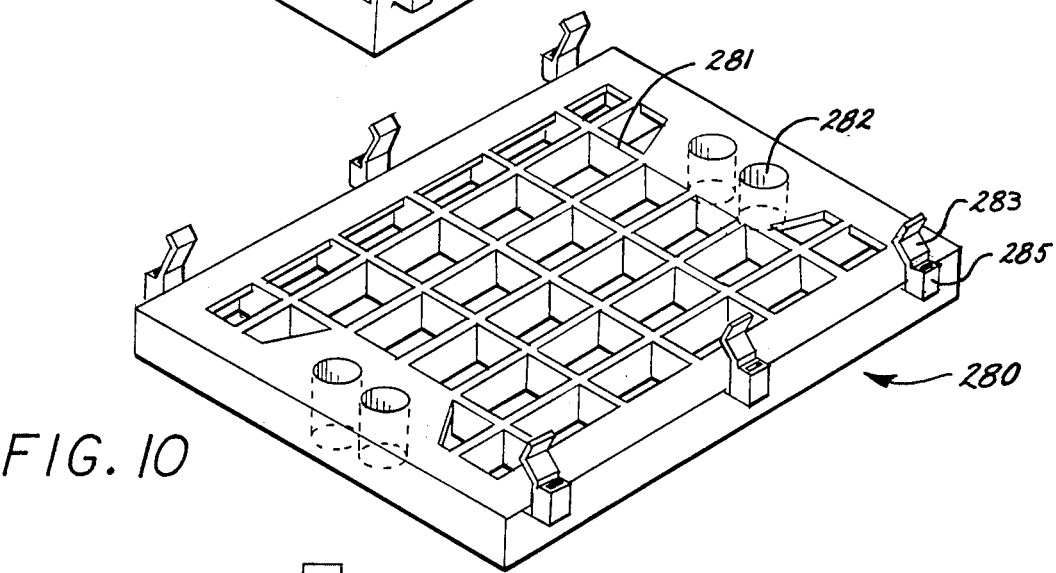
FIG. 10 is a perspective view of another embodiment of a removably attachable height spacer 280.

Other means for removably attaching the height spacer 80 may be utilized as well. For example, as shown in FIG. 10, height spacer 280, which otherwise is substantially identical to height spacer 80 is provided with multiple hook members 283 extending from each of the opposing sides of the height spacer 280, which hook members 283 are adapted to be bent back for hooking and unhooking the members 283 over the ridges 84 as are members 83 of spacer 80. So long as the spacer is attached securely but removably, however, the configuration for the attachment means are not critical.

Figure 11:
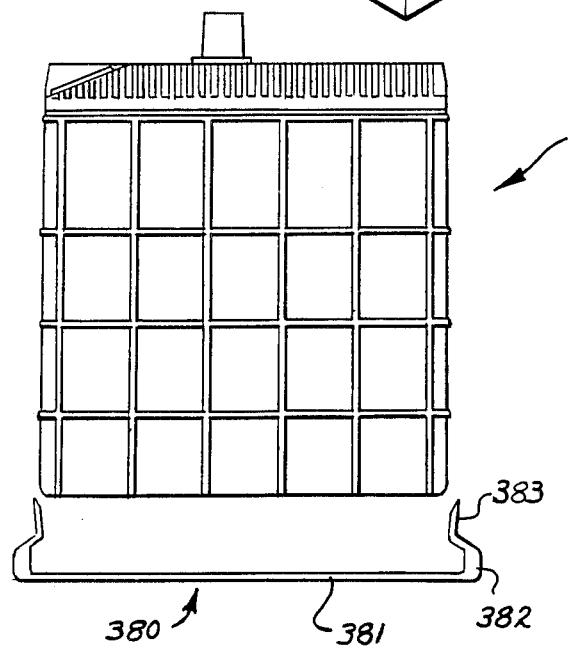
FIG. 11 is an exploded, side view of the battery 10 shown in FIG. 1 and a preferred embodiment of a removably attachable, width spacer 380 of the subject invention.

As shown in FIG. 11 and in accordance with another preferred embodiment of the subject invention, the battery 10 is provided with a width spacer 380. The width spacer 380 comprises a body member 381, enlarged side members 382, and hook members 383. The body member 381 of the spacer 380 has a length generally equivalent to that of the battery 10 and is minimally thin, i.e., it should be thick enough to impart structural integrity to the spacer 380, but not so thick as to significantly increase the height of the battery 10 when it is attached thereto. Analogously to the body of the height spacers 80 and 280, the body member 381 of the width spacer 380 may have cut-out regions which decrease the quantity of material needed to form the spacer 380 but which do not compromise its structural integrity. The enlarged side members 382 of the spacer 380 have a combined width of approximately ¼", such that the combined width of the width spacer 380 and the battery 10 is approximately 7¼, i.e., that of a wide battery. The hook members 383 cooperate with ridges 84 to removably attach the width spacer 380 to the bottom of battery 10. As noted above in regard to the height spacers 80 and 280, however, other means for removably attaching the width spacer 380 may be employed.

It will be appreciated that a width spacer can be provided for a narrow battery which permits the narrow battery to be mounted in standard width and wide battery mounting devices in a manner analogous to that described above in reference to the standard width battery 10 and spacer 380. The enlarged side members would have a combined width of ½" or ¾" to adapt them, respectively, for standard width or wide battery mounting devices.

Finally, the spacers 80 and 380 are directed to adopting a low profile, standard width battery 10 for, respectively, high profile and wide battery mounting devices.

The spacers 80 and 380 are preferred embodiments of the subject invention because they allow the low profile, standard width battery 10 to be used in a very large percentage of all vehicles. Other spaces could be provided, analogous to spacers 80 and 380, which would adopt batteries having external dimensions other than the common variations discussed herein to battery mounting devices also not mentioned specifically herein. A wide variety of spacers can be provided within the scope of the present invention, as desired, to meet any variation in the external dimensions of batteries and battery mounting devices now marketed or hereafter adopted.

As noted above, this invention has been disclosed and discussed primarily in terms of specific embodiments thereof, but it is not intended to be limited thereto. Other modifications and embodiments will be apparent to the worker in the art. For example, the venting system has been described in the context of a six cell battery having two sets of three manifolded cells. While that arrangement has provided excellent results, other manifolding arrangements are possible within the spirit and scope of this invention. The venting system also has been described in a context of a flat top design, but it may be adapted easily to a raised top design provided that it is not necessary or desirable to obtain the benefits of a flat top design.

We claim:

1. A wet, multi-cell, lead-acid electric storage battery comprising a container, a cover assembly, one or more partition walls dividing the space within the container and cover assembly into two or more cells, and a horizontal vent system, which vent systems comprises:
   (a) one or more manifolding apertures in one or more of said partition walls, which apertures are of a size which allows passage of gases and minimizes passage of electrolyte and which define one or more sets of manifolded cells;
   (b) a single trapping chamber associated with each set of manifolded cells;
   (c) one or more vent apertures between each set of manifolded cells and its respective trapping chamber, which vent apertures are of a size which allows passage of gases and minimize passage of electrolyte;
   (d) one or more drain/vent apertures between each set of manifolded cells an its respective trapping chamber, which drain apertures are of a size which allows drainage of electrolyte from said trapping chamber to said manifolded cells and minimizes passage of electrolyte from said cells to said trapping chamber; and
   (e) a single exhaust port associated with each of said trapping chambers, which exhaust ports allow passage of gas from said trapping chambers to the ambient.

2. The electric storage battery of claim 1 comprising five, generally circular shaped, manifolding apertures in one or more of said partition walls and a single vent aperture and a single drain/vent aperture between each set of manifolded cells and its respective trapping chamber.

3. The electric storage battery of claim 2, wherein said vent apertures and said drain/vent apertures are horizontally oriented, generally circular shaped holes.

4. The electric storage battery of claim 3, wherein said manifolding apertures and said vent apertures are located near the plane generally contiguous to the undersurface of said cover assembly and said undersurface substantially defines only negative contours.

5. The electric storage battery of claim 4, wherein said vent apertures and said drain/vent apertures are located near the longitudinal center plane of the battery.

6. The electric storage battery of claim 5, comprising five partition walls; wherein said cover assembly comprises a primary cover and two cover pieces and defines said horizontal vent system; and wherein said horizontal vent system comprises one or more manifolding apertures in, excepting the center partition wall, the four outer partition walls of said five partition walls, which apertures and partition walls define two sets of three manifolded cells, and two trapping chambers, one associated with each set of manifolded cells.

7. The electric storage battery of claim 1, wherein said vent apertures and said drain/vent apertures are horizontally oriented, generally circular shaped holes.

8. The electric storage battery of claim 1, wherein said manifolding apertures and said vent apertures are located near the plane generally contiguous to the undersurface of said cover assembly and said undersurface substantially defines only negative contours.

9. The electric storage battery of claim 1, wherein said vent apertures and said drain/vent apertures are located near the longitudinal center plane of the battery.

10. The electric storage battery of claim 1, comprising five partition walls; wherein said cover assembly comprises a primary cover and two cover pieces and defines said horizontal vent system; and wherein said horizontal vent system comprises one or more manifolding apertures in, excepting the center partition wall, the four outer partition walls of said five partition walls, which apertures and partition walls define two sets of three manifolded cells, and two trapping chambers, one associated with each set of manifolded cells.

* * * * *